E. W. JENKINS.
Gleaner and Binder.
No. 221,235. Patented Nov. 4, 1879.
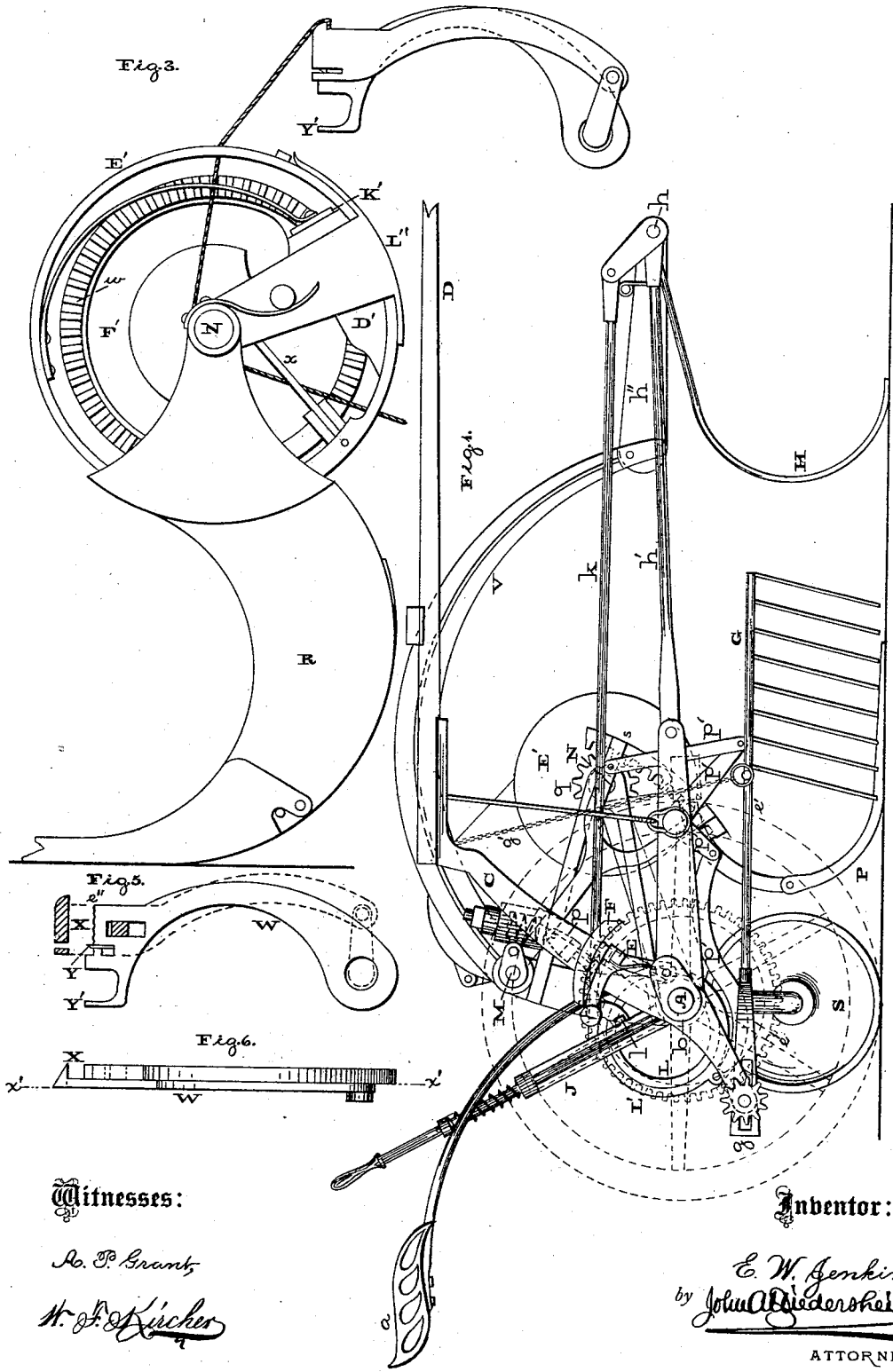

E. W. JENKINS.
Gleaner and Binder.
No. 221,235. Patented Nov. 4, 1879.
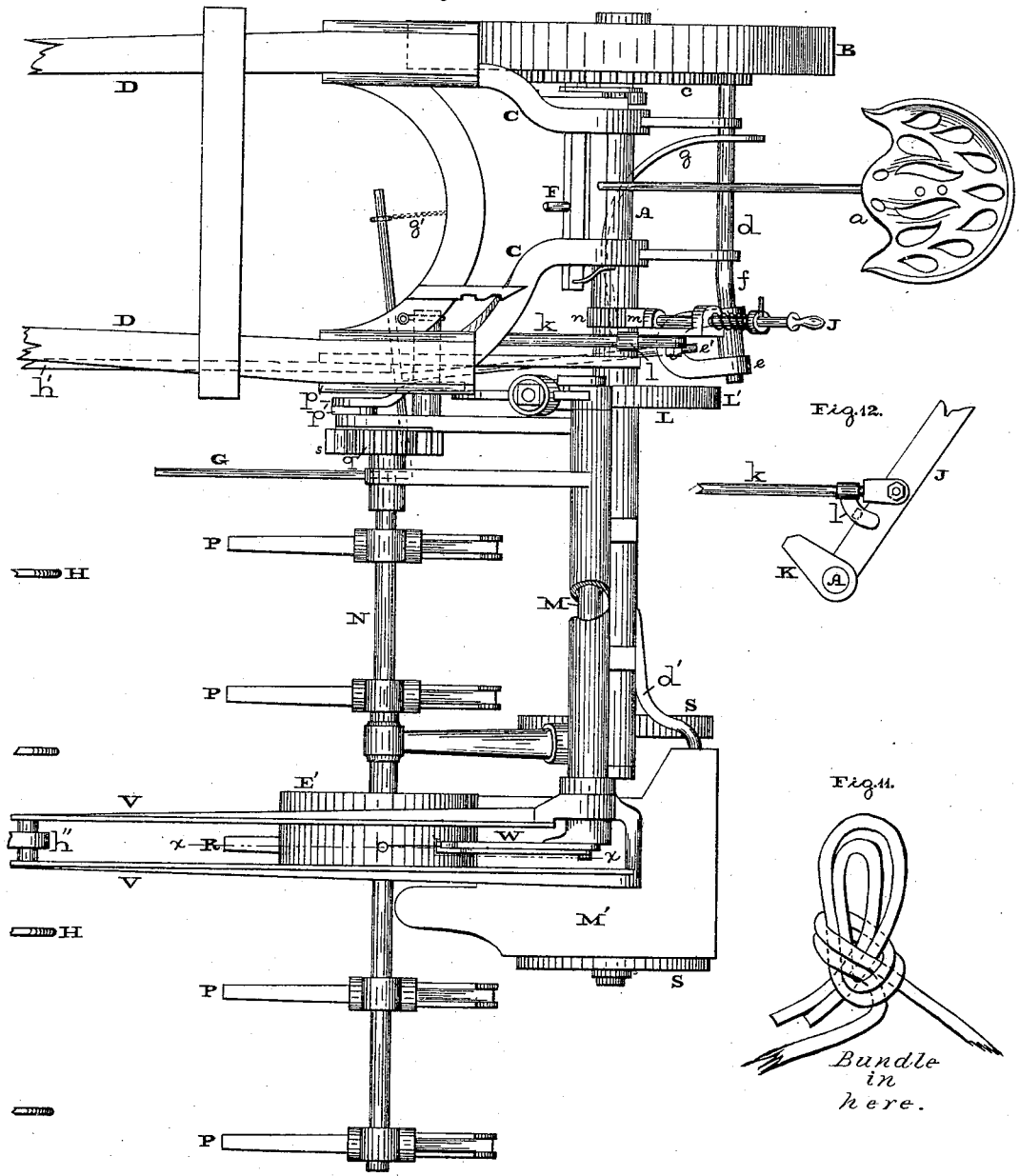
Witnesses:
A. P. Grant,
W. F. Kircher
Inventor:
E. W. Jenkins,
by John A. Wiedersheim
ATTORNEY.

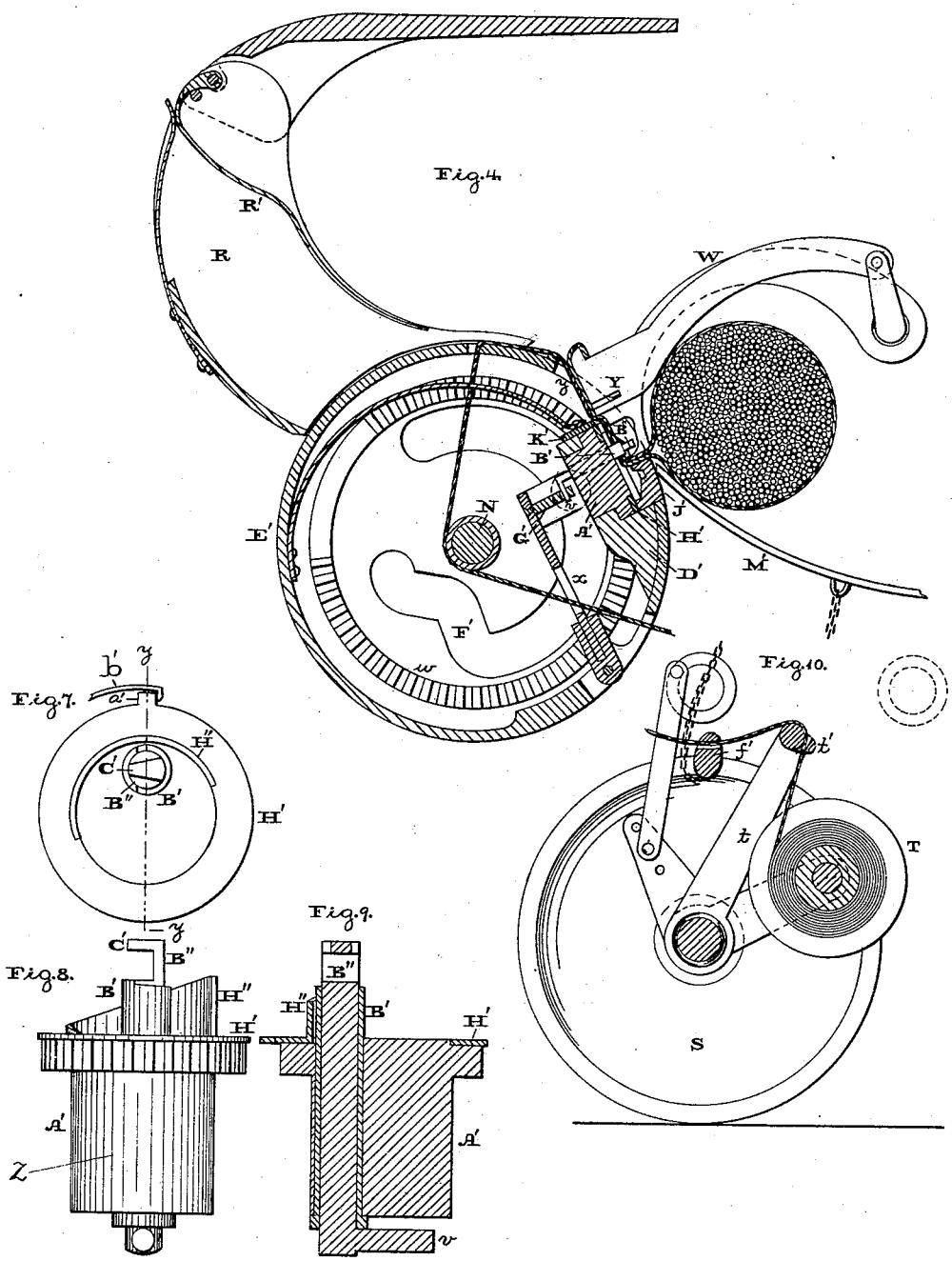

UNITED STATES PATENT OFFICE.

EDWARD W. JENKINS, OF NORRISTOWN, PENNSYLVANIA.

IMPROVEMENT IN GLEANERS AND BINDERS.

Specification forming part of Letters Patent No. 221,235, dated November 4, 1879; application filed May 5, 1879.

*To all whom it may concern:*

Be it known that I, EDWARD W. JENKINS, of Norristown, in the county of Montgomery and State of Pennsylvania, have invented a new and useful Improvement in Gleaners and Binders, which improvement is fully set forth in the following specification and accompanying drawings, in which—

Figure 1 is a side elevation of the gleaner and binder embodying my invention. Fig. 2 is a top or plan view thereof. Fig. 3 is a side elevation (enlarged) of a detached portion. Fig. 4 is a view of the same portion, but in another position, on the sectional line $x\,x$, Fig. 2. Fig. 5 is a side elevation of the nippers, &c., on line $x'\,x'$, Fig. 6. Fig. 6 is a top view of binder-arm. Figs. 7, 8, and 9 are, respectively, end, side, and sectional views of the knot-forming mechanism, &c. Fig. 10 is an enlarged view of the spool or reel, &c. Fig. 11 is a view of the knot as formed. Fig. 12 is a view of a portion of the hand-lever and connected parts.

Similar letters of reference indicate corresponding parts in the several figures.

This invention relates to certain improvements in machines for automatically gleaning and binding grain, which improvements are hereinafter fully described, and clearly set forth in the appended claims.

Referring to the drawings, A represents the main shaft, which is connected to the driving-wheel B. C represents a frame which is mounted on the shaft A and supports the driver's seat $a$ and the shafts or tongue B, by which the apparatus is drawn.

To a collar, $b$, fitted on the shaft A is pivoted a friction-clutch, E, which is pressed against the inner rim of a toothed wheel, $c$, secured to or formed with the driving-wheel B, whereby the main shaft and driving-wheel may be clutched. In order to prevent the action of the clutch E and cause the main shaft to remain inoperative, I employ a lever or throw-off, F, which is movably connected to the frame C, and adapted to bear against an arm of the clutch, whereby the latter is forced from contact with the toothed wheel $c$.

On the rear of the frame C is mounted a counter-shaft, $d$, which carries at one end a pinion meshing with the toothed wheel $c$, and at the other end the support $e$ of a reciprocating butter, G, consisting of a number of teeth secured to a forwardly-extending head, which is connected to an arm, $e'$, attached to said support $e$.

In the present case the arm $e'$ is swiveled to the support $e$, and the end of the shaft $d$, to which the support is connected, is bent as at $f$. A guide, $g$, is jointed to the arm $e'$, and suspended from the shaft $d$, and a chain or strap, $g'$, is suspended from the frame C and connected to the head of the butter.

H represents rake-teeth, which are connected to a crank-shaft, $h$, supported in front of the apparatus on arms $h'\,h''$, the arm $h'$ extending longitudinally forward from the shaft A, or a sleeve thereon, and being suitably braced.

To the crank-arm of the shaft $h$ is attached a rod, $k$, whose rear end is pivoted to a lever, J, mounted on the shaft A, and conveniently accessible from the driver's seat. To the rod $k$ is secured a bearing-piece, $l$, which is adapted to be engaged by a tappet, K, fixed to the main shaft.

The lever J carries a pawl, $m$, which engages with a spur-wheel, $n$, fixed to the main shaft.

Keyed or otherwise secured to the main shaft is an eccentric, L, whose yoke L' is connected by arm $p$ to a rock-shaft, M, which is supported above the shaft A in any suitable manner.

In front of the shaft M is supported, in proper manner, a rock-shaft, N, which carries a series of jointed teeth, P, and a hollow jointed tooth, R, and has secured at one end a pinion, $q$, which meshes with a rack, $s$, connected to the yoke L' of the eccentric L, whereby rotary reciprocating motions are imparted to the said shaft N, and rising and falling motions to the teeth P R.

The side of the apparatus opposite to the wheel B is supported on small wheels S, whose axle is firmly connected to the frame-work of the apparatus, and on said axle is mounted a reciprocating frame operated by the main shaft, and carrying a spool or reel, T, against the periphery of which presses a spring-brake, $t$, which is fitted to the axle of the wheels S, and formed with a slotted arm, $t'$, projecting horizontally and laterally from the upper portion of the brake. The binding-cord is passed from the spool through the slot of the arm $t'$.

V designates a bifurcated guard, which is supported at its rear end on the fixed bearing-sleeve which incases hollow shaft M. The front end of said guard is connected to arm $h''$, sleeved on shaft $h$. This guard affords room between its parts for the operation of the hollow tooth and binder-arm herein described. It also compresses each sheaf and keeps the straw below the binder-arm.

Shaft M is sleeved upon a smaller shaft which extends a little beyond it at the end nearest to eccentric L, and at this point bears a short arm clamped upon it. Eccentric L, by means of its ring and an arm, $p$, extending therefrom, rocks hollow shaft M through the medium of a casting clamped on said latter shaft and inclosing a rod, to the lower end of which arm $p$ is pivotally attached. The upper end of said rod is provided with a disk, which rests upon the top of a spring within said casting, so that the draft of the eccentric on said rod rocks said hollow shaft M through a yielding connection. The shaft within said hollow shaft is operated by means of a short arm on said inclosed rod, which arm protrudes through the rear side of the inclosing casing, and has a wrist-pin connection with the arm or tappet on the end of the said inner shaft. The other end of said hollow shaft M has one of the two sections of the binding-arm clamped on it, so as to rock with said hollow shaft. The corresponding end of the inner shaft has a crank-arm secured to it, which carries the other section of said binding-arm, pivotally attached by its rear end to a wrist-pin on said crank-arm. These two sections are arranged parallel, and the one attached to the inner shaft is provided with a nipper-jaw, which overlaps the nipper-jaw on the end of the other, thus forming a pair of nippers for holding the cord.

The section attached to the hollow shaft is carried forward by the revolution of the shaft until it abuts against the abutment-jaw described below. The spring-connection then allows it to remain there, while the action of the eccentric goes on and draws the connecting-rod down farther, thereby rocking the inner shaft and opening the nippers by throwing the nipper-arm or section attached to the crank on the inner shaft farther forward than the other section of the nippers. At other times the action of the spring keeps the jaws together.

The continued operation of the eccentric L speedily causes the withdrawal of this extended section, and then of both the sections together, cutting the doubled cord as the nippers close by means of knife or cutter Y, and carrying back a fresh supply of cord to begin the binding and tying of the next sheaf.

The knife or cutter Y is on the forward end of the section of binder-arm W attached to hollow shaft M, and it works into an opening in the opposite jaw of the nippers. The sections of the binder-arm are guided in their movements past each other by a block on one, which slides in a slot of the other.

The spring in the casting above described allows the binding-arm to remain in contact with the tying devices, and the nippers to remain open for a short time after eccentric L begins its reverse action on arm $p$ and the shafts. This causes a certain additional amount of cord to be drawn through said nippers before cutting the cord, and thus leaves a sufficient length of the latter beyond the knot to prevent accidental untying.

The spring may be varied in form or located at any other point between eccentric L and clamping-arm W.

Z represents what I denominate the "tyer," which consists of a toothed wheel, $A'$, in the hub of which is an opening eccentric therein, and receiving a sleeve, $B'$, in which is fitted a spindle, $B''$, having at one end a finger, $C'$, and at the other end an arm, $v$.

The wheel $A'$ is journaled in a block, $D'$, secured to a cap, $E'$, which is properly supported on the frame-work of the apparatus, and the teeth of the wheel $A'$ engage with a crown-wheel, $w$, which is connected to the rock-shaft N, whereby rotary motions are imparted to said wheel $A'$.

A cam groove or slot, $F'$, is formed in the crown-wheel $w$, and adapted to reciprocate an arm, $x$, which is pivoted to the cap $E'$ and carries a swiveled eye, $G'$, which engages with the arm $v$ of the spindle $B''$, whereby the latter is advanced and withdrawn through the hub of the toothed wheel $A'$, and said wheel is permitted to rotate without interfering with the motions of the spindle.

On the side of the wheel $A'$ adjacent to the finger $C'$ is loosely fitted a ring-disk, $H'$, having a circular inclined guide, $H''$, and having a tooth, $a'$, against which presses a spring, $b'$, which is secured to the cap $E'$.

In the periphery of the cap $E'$ is fitted an abutment-jaw, $J'$, which is grooved on its under side to overhang the finger $C'$ and the inclined guide $H''$ of the tyer.

$K'$ represents a spring-plate, which is pressed against the block $D'$, adjacent to the opening $y$; and $L''$, a covering-plate, which is hung on the shaft N, and adapted to slide over the cap $E'$, adjacent to the opening $y$.

To an arm, $d'$, secured to the frame-work of the apparatus beneath the binder-arm, is hung a table, $M'$, which overhangs the spool or reel T.

The operation, so far as not hereinbefore fully described, is as follows: The grain is raked and butted in sheaves, taken from the ground, and carried up under the guard in reach of the binder-arm, the rear teeth and arm being both worked reciprocally by the eccentric. The eccentric brings up the teeth, and while it is passing its center the binder-arm is in full motion, binding the sheaf, the head of the binder-arm entering the hollow tooth, so as not to be obstructed with straw. One end of the cord is in the nippers on the head, the cord passing around the bill on the head and around the sheaf to the spool. As the arm binds the sheaf it puts the cord in the tyer. The spool moves toward the tyer and relieves the tension, allowing the knot to be tied with ease. Meanwhile the cord is passing through the nippers, clearing out all obstructions that might otherwise be deposited there.

The spool is placed in the rear of the machine, mounted upon a reciprocating spindle, and has a tension-brake, the cord from the spool running through an arm on the brake. As the spool unwinds the cord must necessarily pull harder to turn the spool, and as the cord runs through and from the arm on the brake it lifts the brake from the spool, and so allows the spool to turn with but little variation in the tension. The lower end of the rear teeth are jointed, so that they will accommodate themselves to uneven ground. The joints may be dispensed with on level parts of the country. Wooden pins may be employed to break and relieve the tooth of strain. The drop-teeth in front divide the sheaves; but they may be dispensed with where the grain is thin.

The binder or clamping arm in delivering the cord to the tying devices holds it against the abutment-jaw above described, clamping both thicknesses of cord—namely, the cut end and the continuous cord from the spool—together. The large loop formed by the end of the cord thus doubled and held incloses the sheaf. As the pinion or wheel A' turns it causes the eccentrically-arranged sleeve B' to engage with the doubled cord behind said abutment, and to carry said cord around with it, forming a circle or ring in said doubled cord by said motion. To insure such action the doubled cord is clamped against the clamping-arm and near the cutter by the spring and plate K', which allows the cord to be drawn through it by the pull of said sleeve engaging therewith, as aforesaid, but compels the two thicknesses of cord to remain parallel and together between said spring and said sleeve. The rotation of the wheel or pinion A' is in such direction that the tapering or lesser part of stationary flange H'' comes first into engagement with said doubled cord. This takes place after the ring or circle in said doubled cord has been formed, as aforesaid, and the engagement is with that part of the cord which is just beyond said loop in the direction of the cutter. Said flange H'' may be held stationary by a spring-catch and lug, (shown in Fig. 7,) or by any other devices. The travel of the aforesaid sleeve causes the doubled cord to slide up the incline of said flange until it is lifted above the ring or circle of cord formed around said sleeve. In so doing it necessarily draws a little more cord through the clamping-jaws. The slack cord thus acquired is presented by such lifting action to the hook C' and seized thereby. When said hook is withdrawn by agencies already described, it carries with it a loop of the doubled cord into the hollow wheel or pinion A'. The withdrawal into said pinion of sleeve B' necessarily slips the circle or ring of cord already described upon the loop, and the draft on the end of the loop completes the knot. The upper end of the loop in Fig. 11 is the end which the hook draws. The sheaf is thereby fully bound, and nothing remains but to cut the cord and provide a supply for the next sheaf, as already described.

The butter is a head provided with teeth projecting toward the ground, the teeth inclining backward, so as to go over stones, roots, and stumps.

The weight $f'$, attached to the chain on the cord, takes up the slack or keeps the cord from crimping when the tension is slackened.

The machine runs on three wheels.

The hollow tooth R has a spring-tongue, R', which prevents entrance of obstructions.

If desired, the teeth P R and binder-arm may be reversed and rotate in the opposite direction to that shown.

Having thus described my invention, what I claim as new, and desire to secure by Letters Patent, is—

1. In a gleaner and binder, the combination of a front series of teeth, arranged to divide the grain for sheaves, with a rear series of teeth, arranged to rake up and elevate said grain.

2. In a grain-binder, the combination of a binding-arm with a bifurcated guide-bar, which assists in supporting the front rake.

3. In a gleaner and binder, the combination, with the forward and backward operating rake-teeth, of a butter-rake operating transversely by positive motion, for the purpose set forth.

4. A hollow tooth, R, provided with a spring-tongue, in combination with a binder-arm, said spring-tongue preventing the entrance of obstructions.

5. In combination with automatic tying devices, a binder-arm which compresses the sheaf and carries the cord, and which presses the cord against an abutment during the tying, a spring whereby said clamping is prolonged after the tying, and cutting devices carried by said binder-arm, said parts being arranged in such manner as to leave long ends of cord beyond the knot to prevent untying.

6. The swiveled eye G' of the reciprocating arm, in combination with the hooked spindle, substantially as and for the purpose set forth.

E. W. JENKINS.

Witnesses:
JNO. A. BELL,
JOHN A. WIEDERSHEIM.